United States Patent [19]

Cugley

[11] Patent Number: 4,687,129
[45] Date of Patent: Aug. 18, 1987

[54] REUSABLE CONTAINER
[75] Inventor: Derwyn Cugley, Brea, Calif.
[73] Assignee: VSI Fasteners, Inc., Stanton, Calif.
[21] Appl. No.: 876,974
[22] Filed: Jun. 20, 1986

Related U.S. Application Data
[63] Continuation of Ser. No. 773,350, Sep. 6, 1985.

[51] Int. Cl.⁴ .............................................. B65D 5/66
[52] U.S. Cl. ................................. 229/44 R; 220/339; 206/45.34; 206/470
[58] Field of Search .................. 229/44 R, 2.5 R, 902, 229/905, 915, DIG. 11; 206/503, 505, 508, 44 R, 45.21, 45.28, 45.34, 470; 220/334, 337, 339

[56] References Cited
U.S. PATENT DOCUMENTS 4,060,173 11/1977 Dahl ..................................... 220/339
4,098,430 7/1978 Mattheis et al. ..................... 220/339
4,427,129 1/1984 Wyslotsky et al. .............. 206/45.34
4,498,589 2/1985 Scott et al. ........................... 206/470
4,499,353 2/1985 Shields ................................ 206/470
4,570,818 2/1986 Borst et al. ....................... 229/44 R Primary Examiner—Willis Little
Attorney, Agent, or Firm—Frederick Gotha

[57] ABSTRACT

An improved one-piece reusable container is formed from transparent plastic. The lid of the container is clear and transparent with no distortion for easy viewing of the contents. The sides of the container chamber are slanted inward to allow nesting of the containers during shipping. The container is semi-rigid with good structural integrity; and will not deform during normal handling and usage. The container has a latch to insure that it will not open during shipping and display, but will only open when the lid and chamber are pulled apart in a predetermined manner.

20 Claims, 8 Drawing Figures

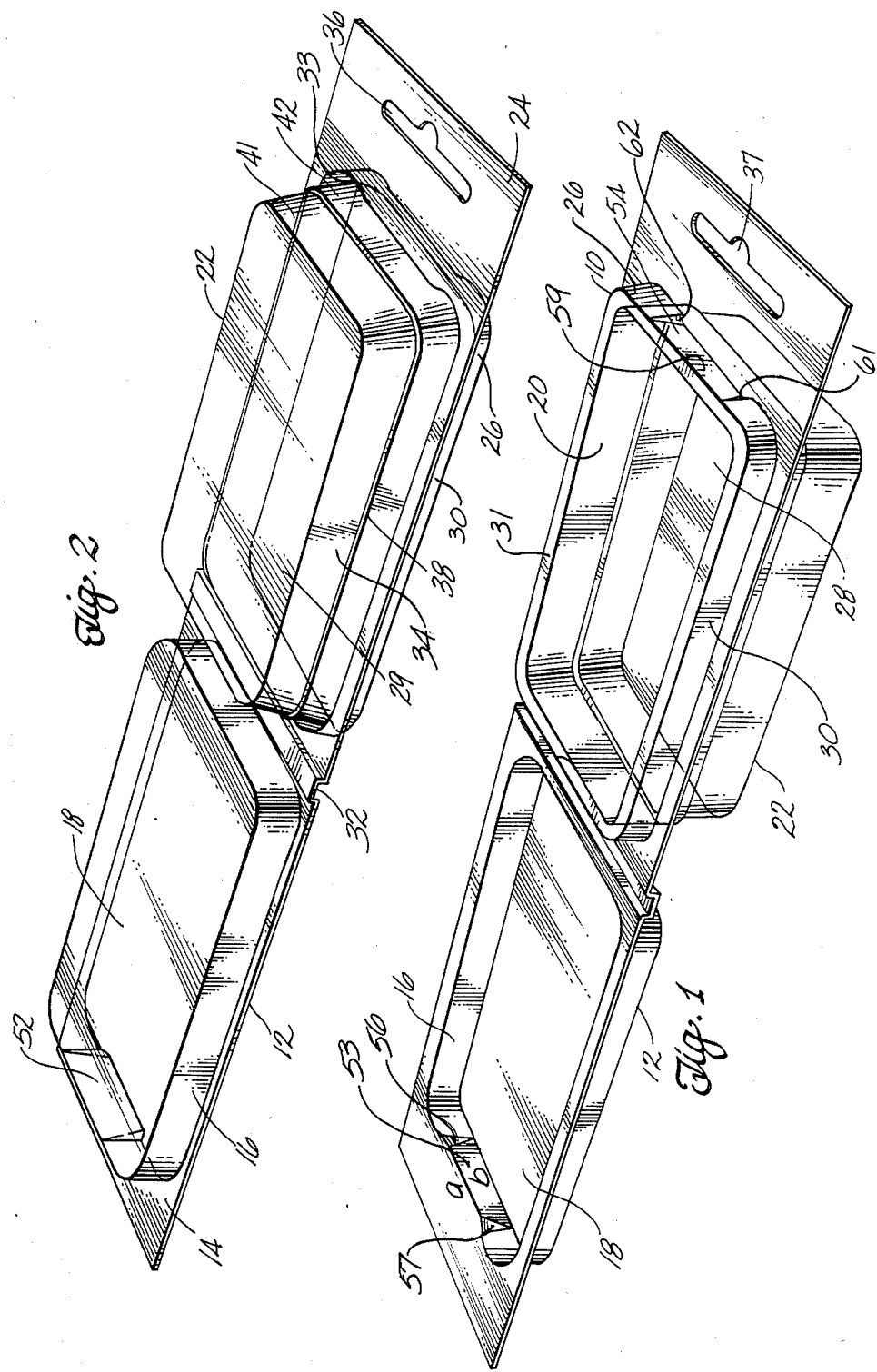

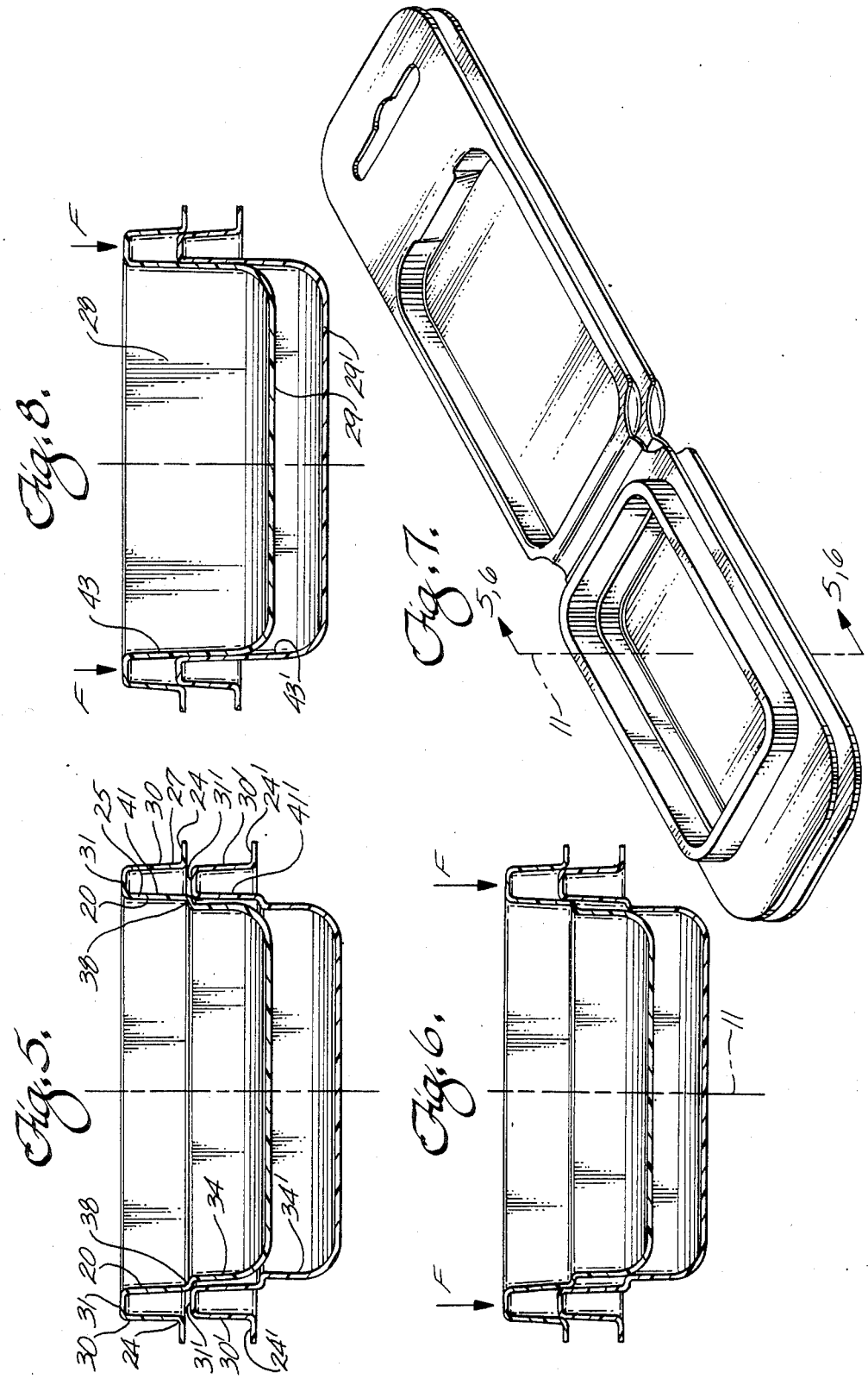

REUSABLE CONTAINER

CROSS-REFERENCE TO RELATED APPLICATION

This is a continuation of application Ser. No. 06/773,350, filed Sept. 6, 1985.

BACKGROUND

This invention relates to an improved reusable, transparent, plastic container for use in storing, transporting, and displaying small objects; particularly fasteners such as screws, bolts, nuts, and washers.

Several similar containers have been marketed in recent years (see for example U.S. Pat. Nos. 3,082,903, and 4,202,464).

Thin walled plastic containers of the prior art which have tapered sidewalls and are capable of being nested when pressed into a stack have a tendency to wedge into each other and become jammed. U.S. Pat. No. 4,202,464 demonstrates a reclosable container made of a thin plastic material having tapered sidewalls and having an endwall which is substantially normal to the base and an opposite endwall which is angularly oriented from the normal in an outward direction at an angle which is at least twice the outward angular orientation of the sidewalls. This construction permits a plurality of similarly constructed containers to be stored in a stack like fashion. However, when the containers are actually pressed together into a stacked or nesting configuration, the containers wedge into each other and are difficult to separate thereby inducing packaging delays particularly in automatic packaging lines.

Containers in the prior art of the type which have a flange and slot where the slot permits the container to be hung vertically for merchandise display, generally have a label attached to the lid surface of the container. The presence of the label on the lid surface tends to obscure the goods during display. The present invention provides an extended flange area upon which the label may be affixed thereby allowing the goods to be observable directly through the transparent lid.

Applicant is unaware of any container in the prior art that has the following combination of features:

1. a large flange are for affixing a label to identify the container content;
2. clear surfaces on both flat surfaces of the container so that the entire contents of the container can be viewed without distortion;
3. a secure latch design to prevent the unwanted opening of the container;
4. a compact container design so that multiple containers can be aligned in the vertical plane as part of a merchandising display; and
5. a container design which permits nesting containers to be pressed together in a fashion which permits ready and easy separation of the nested containers by eliminating the wedging and jamming that occurs when tapered surfaces are pressed into each other.

SUMMARY OF THE INVENTION

The primary object of the present invention is to provide an improved, one-piece, reusable container which will not accidentially open during shipment, storage or handling but will readily open when pulled apart in a predetermined manner.

Another object of the present invention is to provide a container with two flat and clear display surfaces, that enable nondistorted visual inspection of the contents.

Still another object of the present invention is to reinforce and strengthen the sidewall around the container chamber, and allow the containers to be stacked within other similarly dimensioned containers during storage, so as to minimize storage space.

Further object of the present invention is to provide a container design which permits containers which are stacked or nested within similarly dimensioned containers to be releasably locked together and easily removeable from one another particularly when utilized in automatic packaging lines.

Yet another object of the present invention is to overcome the disadvantages of other container designs with a new, improved container, that is simple and inexpensive in design and operation.

The improved container is fabricated from one piece of transparent, moldable plastic material. An integral hinge is located between the lid and the chamber. The lid surface and the chamber surfaces are flat, smooth and transparent to avoid distortion when one views the contents.

The container chamber is surrounded by a raised U-shaped channel. The outside sidewall of the raised channel has an outermost surface which forms a male mating surface, and the inside sidewall of the raised channel has an innermost surface which defines in part the boundary of the chamber cavity. The sidewalls of the container lid form the female mating surface when the container is closed. The chamber cavity is bordered by the innermost surface of the inside sidewall of the raised channel, a peripheral rim integrally formed with and extending into the cavity from the raised channel's inside sidewall, and a second sidewall extending from the peripheral rim at an angle having less inward taper than the taper of the inside sidewall of the raised channel. The inward taper of the inside sidewall of the raised channel and the inwardly extending peripheral rim from which the second sidewall extends at an angle less than the inward taper of the raised channel's inside sidewall, permit similarly dimensioned containers to be pressed together in a nested or stack-liked fashion for storage such that the containers may be easily separated from one another at the time of use.

Both the container lid and chamber have elongated flanges, which may be used to affix a label that identifies the contents of the container. A hole is inserted through the flange to hang the container vertically from a hanger display. There is a latch on the female mating surface and in the preferred configuration on the corresponding male mating surface. The preferred embodiment is a depressed region, so designed that it can only be opened by applying opposing forces perpendicular to the plane of the container.

The novel features which are believed to be characteristic of the invention as to the container configuration together with further objects and advantages thereof, will be better understood from the following description in connection with the accompanying drawings in which the presently preferred embodiment of the invention is illustrated by way of example. It is to be expressly understood, however, that the drawings are for purposes of illustration and description only, and are not intended as a definition of the limits of the invention.

BRIEF DESCRIPTION OF THE DRAWINGS

FIG. 1 illustrates the container of the present invention when in the open position, face up.

FIG. 2 illustrates the same container as FIG. 1, in the open position, face down.

FIG. 5 illustrates a cross-sectional view of nested containers taken along 5—5 of FIG. 7.

FIG. 6 is a cross-sectional view of nested containers after a force has been applied to press the containers into a releasable locked configuration.

FIG. 7 is a perspective view of similarly dimensioned containers which are nested together.

FIG. 8 is a cross-sectional view of an alternative configuration of nested containers.

DETAILED DESCRIPTION

Figure 4:
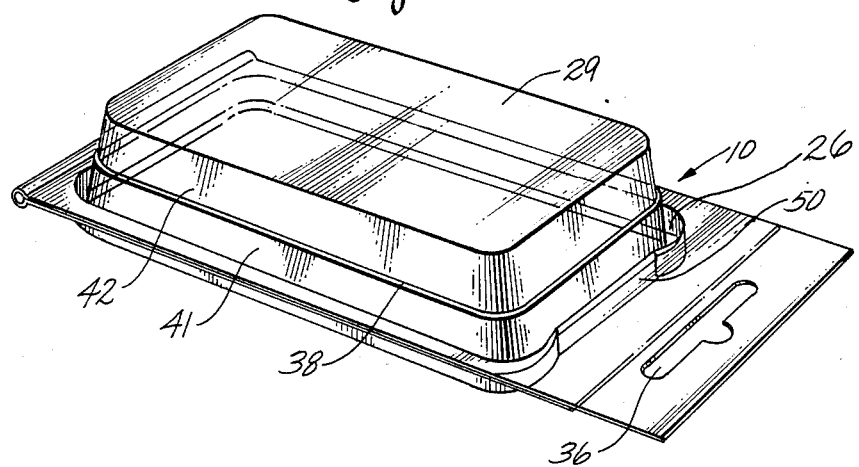
FIG. 4 illustrates the same container as FIG. 1, in an inverted closed position.

Referring now to the drawings, FIG. 1 and FIG. 2 show the container in the open position and FIGS. 5 and 6 illustrate a plurality of containers in a nested position along a nesting axis 11.

Lid member 12 consists of a thin flat and elongated flange 14, and a recessed area 16 surrounding smooth lid surface 18. Smooth lid surface 18 is essentially flat and substantially parallel to the plane of elongated flange 14. Recessed area 16 is integrally formed with smooth lid surface 18 and flange 14 such that a first body member is defined which is integrally hinged with a second body member, namely, chamber member 22.

Chamber member 22 consists of a flat and elongated flange 24, a raised channel 26, and a recessed chamber 28 which defines a cavity in chamber member 22 with chamber surface 29 forming the bottom wall boundary of said cavity.

Raised channel 26 is a raised tapered U-shaped member integrally formed with the surface of flat elongated flange 24 and is bounded by inside sidewall 25 and outside sidewall 27 which lay in planes that intersect the plane of flange 24 as shown in FIGS. 5 and 6. Referring to FIG. 5, sidewall 25 tapers inwardly as it descends in the direction of chamber surface 29 and sidewall 27 tapers outwardly as it descends toward chamber surface 29. Sidewalls 25 and 27 are integrally formed with top wall 31 which is substantially parallel to the plane of flat elongated flange 24 thereby defining a continuous opening 33 in the surface of flange 24 where said opening is bounded by sidewalls 25 and 27 and top wall 31.

The outermost surface of raised channel 26 is male surface 30 that cooperates with recessed area (female surface) 16 during closure of container 10. Inside sidewall 25 has an innermost surface 20 which along with the innermost surface of rim 38 define a part of the cavity boundary of recessed chamber 28.

During closure, lid member 12 covers chamber member 22 to form a sealed blister box.

Flexible hinge 32 is integrally connected to lid member 12 and chamber member 22, and enables container 10 to open and close.

Lid member 12 is larger than and fits onto chamber member 22. Since container 10 is generally displayed while suspended from a protruding object inserted through slot 36, with centering notch 37, it is preferred that the lid surface be smooth and flat, so that objects in container 10 can be viewed clearly with minimal distortion.

Rather than having a ribbing surrounding lid surface 12, as has been done in prior art blister boxes, for example as shown in U.S. Pat. No. 4,202,404, in the present invention there is no ribbing or peripheral grove in the lid 18 or chamber surface 29. Rim 38, however, which forms a peripheral shoulder at the juncture of recess 41 and recess 42 improves the ridigity of chamber member 22. Recess 41 is a first recessed area which is defined by sidewall 25; recess 42 is a second recess area defined by second sidewall 34 which extends from recess 41 as shown in FIGS. 4 and 5. Sidewall 25 and second sidewall 34 in combination with chamber surface 29 form the cavity boundary of recessed chamber 28.

As shown in FIG. 5, recess 42 is substantially vertical with preferably less inward taper in the descending direction toward chamber surface 29 than recess 41; rim 38 is essentially parallel to the plane of flat and elongated flange 24 and is spaced below the plane of flange 24 in the direction of chamber surface 29. This construction allows for compact storage of the containers in an open position and permits a plurality of containers to be nested. For the purposes of storage, shipment and automatic assembly line packaging, it is desirable to stack containers in such a manner that they are readily separable from each other. As can be seen in FIG. 6, when a slight force F is applied to press the containers together, raised channel 26' inserts into channel 26 a slight distance until movement is restricted by the taper of sidewalls 25 and 27 and the engagement of rim 38' with second sidewall 34. The nested containers as a result of such construction may be releasably locked together and are readily separable from one another by applying a separation force to flanges 24 and 24'.

In an alternative configuration, shown in FIG. 8, recesses 41 and 42 may form a continuous straight sidewall 43 which is substantially vertical with a slight inward taper in the descending direction toward chamber surface 29. This configuration permits containers which are similarly dimensioned to be releasably locked together when a slight force is applied to press the containers into a nesting configuration as shown in FIG. 8. Raised chamber 26 inserts into raised chamber 26' until further movement is restricted by the taper of sidewalls 25 and 27.

Figure 3:
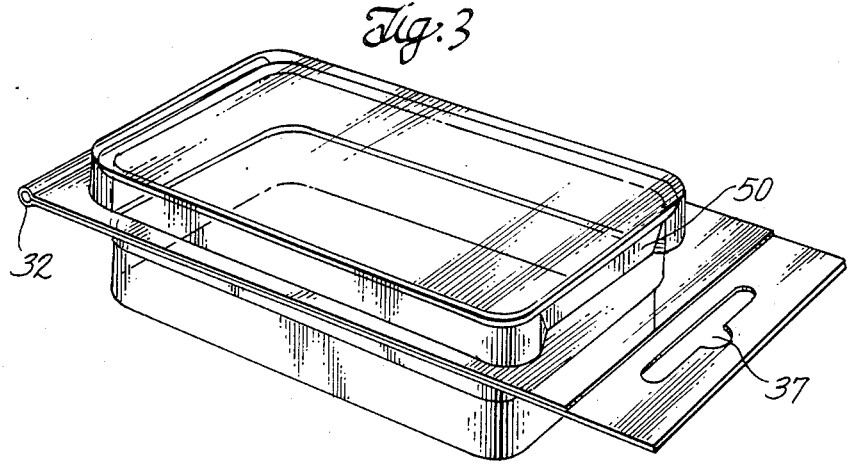
FIG. 3 illustrates the same container as FIG. 1, in an upright, closed position.

Latch 50 (see FIG. 3 and FIG. 4), has been incorporated into the design of container 10 to safeguard against accidental opening during shipping, handling, or display.

Latch 50 consists of lid depression 52 along recessed area 16 most remote from the hinge 32, and cooperating with chamber depression 54 along male surface 30 most remote from the hinge 32. Chamber depression 54 is deepest adjacent to and in the plane of flange 24, and lid depression 52 is deepest adjacent to and in the plane of lid flange 14. Lid depression 52 has a latch bearing surface 53 of trapazoidal shape which slopes inwardly ascending from lid surface 18 to elongated flange 14. The width a of latch surface 53 at the intersection of said surface 53 with elongated flange 14 is less than the width b of latch surface 53 at the intersection of said surface with lid surface 18. As can be seen in FIGS. 1 and 7, latch surface 53 forms a ramp with ramp sidewalls 56 and 57. Similarly chamber depression 54 along male surface 30 has a second latch surface 59 which tapers inwardly descending from top wall 31 in the direction of chamber surface 29. Second latch surface 59 is rectangularly shaped with triangular transition surfaces 61 and 62 formed at the juncture of said second latch surface with male surface 30. Triangular transition surfaces 61 and 62 are of a smaller surface area than ramp sidewalls 56 and 57.

Lid depression 52 at the intersection of latch surface 53 with lid surface 18 has minimal depth measured in the direction of hinge 32 along lid surface 18 and lid depression 52 has maximum depth at the intersection of latch surface 53 with elongated flange 14; and cooperating chamber depression 54 has minimal depth at the intersection of second latch surface 59 with top wall 31 and maximum depth at the intersection of second latch surface 59 with flat and elongated flange 24. Preferably the distance from the intersection of latch surface 53 with lid flange 14 to hinge 32 is shorter than the distance from the intersection of second flange surface 59 with top wall 31 to hinge 32. Hence, to close or open container 10, it becomes necessary to slightly deform container 10 to engage or disengage latch 50.

The area of latch surface 53 of lid depression 52 is slightly less than the area of second latch surface 59. This enables lid depression 52 to fit snuggly into and be captively held by chamber depression 54 during closure of the lid.

Another embodiment for the latch mechanism is shown in FIG. 7 which illustrates a smooth surface coutour of male surface 30 at the region where lid depression 52 cooperates with male surface 30 during closure of the lid. Latch surface 53 bears against male surface 30 and as a result of the resiliancy of the thin plastic material from which the container is molded, a bias or spring force is exerted against surface 30 thereby biasing the lid member 12 against male surface 30 to form a releasable lock.

Accordingly there has been provided in accordance with the invention, a container configuration that fully satisfies the objectives set forth above. It is understood that all terms used herein are descriptive rather than limiting. While the invention has been described in conjunction with specific embodiments, it is evident that many alternatives, modifications, and variations will be apparent to those skilled in the arts in light of the disclosure herein. Accordingly it is intended to include all such alternatives, modifications, and variation that fall within the spirit of the impended claims.

I claim:

1. A container formed from a single piece of transparent, moldable sheet material, which comprises:
    (a) a first body member having
        a first, flat, elongaged flange
        a protruding, flat, smooth surface substantially parallel to said flange, and
        a female mating region between said flange and said surface;
    (b) a second body member having
        a second, flat, elongated flange
        a raised channel formed within said second flange having an inside sidewall and an outside sidewall
        a male mating region which is formed on the outermost surface of said outside sidewall of said raised channel, said male mating region cooperating with said female mating region during closure of said container, and
        a recessed chamber formed within the innermost surface of said inside sidewall of said raised channel, said recessed chamber having a second recessed area extending from a first recessed area;
    (c) an integral hinge connecting said first body member to said second body member, said hinge enabling said container to open and close; and
    (d) a latching means having a first depression located along said male mating region which fits into a second depression located along said female mating region during closure of said container.

2. The structure of claim 1, wherein said inside sidewall of said raised channel is slanted inward.

3. The structure of claim 1, wherein the area of said first depression is less than the area of said second depression.

4. The structure of claim 1, wherein said first depression is deepest adjacent to said first flange.

5. The structure of claim 4, wherein said second depression is deepest adjacent to said second flange.

6. The structure of claim 1, wherein said first and said second depressions are located on said female mating region and said male mating region respectively most remote from said hinge.

7. The structure of claim 2, wherein said outside sidewall of said raised channel is slanted outward such that when a plurality of like dimensioned containers are stacked said inside sidewall and said outside sidewall of said raised channel member will insert into the corresponding channel member of an adjacent like dimensioned stacked container thereby releasably locking said containers together.

8. The structure of claim 7, further comprising a peripheral shoulder integrally formed with and extending inwardly from said inside sidewall where said peripheral shoulder is spaced from the plane of said second elongated flange.

9. The structure of claim 8, wherein said second recessed area has less inward taper than said first recessed area such that said peripheral shoulder of a like dimensioned container will bear against said second recess area during stacking of adjacent containers.

10. An improved container of the type formed of a single piece of transparent moldable resilient sheet material having a nesting axis, an integral hinge connecting a lid member to a chamber member where said lid member has a peripheral female mating surface extending from a first flat elongated flange, and where said chamber member has a second elongated flange, a chamber recess defined by a bottom wall and peripherally extending sidewall, and a raised U-shaped peripheral channel having inside and outside sidewalls and a topwall which define a continuous peripheral opening in said second flange where the inside sidewall of said U-shaped channel is an integral part of said peripherally extending sidewall of said chamber recess and where the outermost surface of the outside sidewall of said channel forms a male mating surface, the improvement comprising a lid depression contained with said female mating surface such that upon closure of said lid member sid lid depression bears upon said female mating surface.

11. The improved container of claim 10, wherein said male mating surface is flat and continuous and said lid depression has a latch bearing surface for biasing said lid member against said male mating surface.

12. The improved container of claim 11, wherein said outside sidewall of said raised channel tapers outwardly and said inside sidewall of said raised channel tapers inwardly such that when a plurality of like dimensioned containers are stacked said inside sidewall and said outside sidewall will insert into the corresponding raised channel member of an adjacent like dimensioned stacked container thereby releasably locking said containers together.

13. The improved container of claim 12, wherein said peripherally extending sidewall of said chamber recess is continuous and tapers inwardly.

14. The improved container of claim 13, wherein said chamber member has a peripheral shoulder extending inwardly into said chamber recess from said inside sidewall where said peripheral shoulder is spaced below said second elongated flange.

15. The improved container of claim 14, wherein said peripherally extending sidewall comprises a second sidewall extending from said inside sidewall where said second sidewall has less inward taper than said inside sidewall.

16. The improved container of claim 10, wherein said female mating surface contains a chamber depression which captively holds said lid depression during closure of said lid member.

17. The improved container of claim 16, wherein said outside sidewall of said raised channel tapers outwardly and said inside sidewall of said raised channel tapers inwardly such that when a plurality of like dimensioned containers are stacked said inside sidewall and said outside sidewall will insert into the corresponding raised channel member of an adjacent like dimensioned stacked container thereby releasably locking said containers together.

18. The improved container of claim 17, wherein said peripherally extending sidewall of said chamber recess is continuous and tapers inwardly.

19. The improved container of claim 18, wherein said chamber member has a peripheral shoulder extending inwardly into said chamber recess from said inside sidewall where said peripheral shoulder is spaced below said second elongated flange.

20. The improved container of claim 19, wherein said peripherally extending sidewall comprises a second sidewall extending from said inside sidewall where said inside sidewall has less inward taper than said second sidewall.

* * * * *